United States Patent [19]

Balson

[11] 3,829,975
[45] Aug. 20, 1974

[54] DENTAL MATRIX BAND AND CLAMP
[76] Inventor: John E. Balson, Devon Professional Bldg., Devon, Pa. 19333
[22] Filed: Nov. 28, 1973
[21] Appl. No.: 419,709

[52] U.S. Cl. .................................................. 32/63
[51] Int. Cl. ............................................. A61c 5/12
[58] Field of Search ........ 24/260, 20, 21, 25; 32/63, 32/66

[56] References Cited
UNITED STATES PATENTS
| | | | |
|---|---|---|---|
| 1,003,907 | 9/1911 | Hoffman | 24/21 |
| 3,300,825 | 1/1967 | Andreason | 24/25 |
| 3,311,957 | 4/1967 | Dunn | 24/21 |
| 3,383,769 | 5/1968 | Davis | 32/63 |

Primary Examiner—Robert Peshock
Attorney, Agent, or Firm—John W. Logan, Jr.

[57] ABSTRACT

A disposable dental matrix band and clamp assembly is provided which may be secured to a patient's tooth with a minimum of discomfort and annoyance to the patient. The clamp has a central opening extending through it which receives preformed end portions of a matrix band. Serrated edge surfaces are provided on the band end portions and an integral latch member formed as part of the clamp engages the serrated edges of the band to prevent the band from loosening about the tooth until the latch is manually disengaged from the band.

10 Claims, 7 Drawing Figures

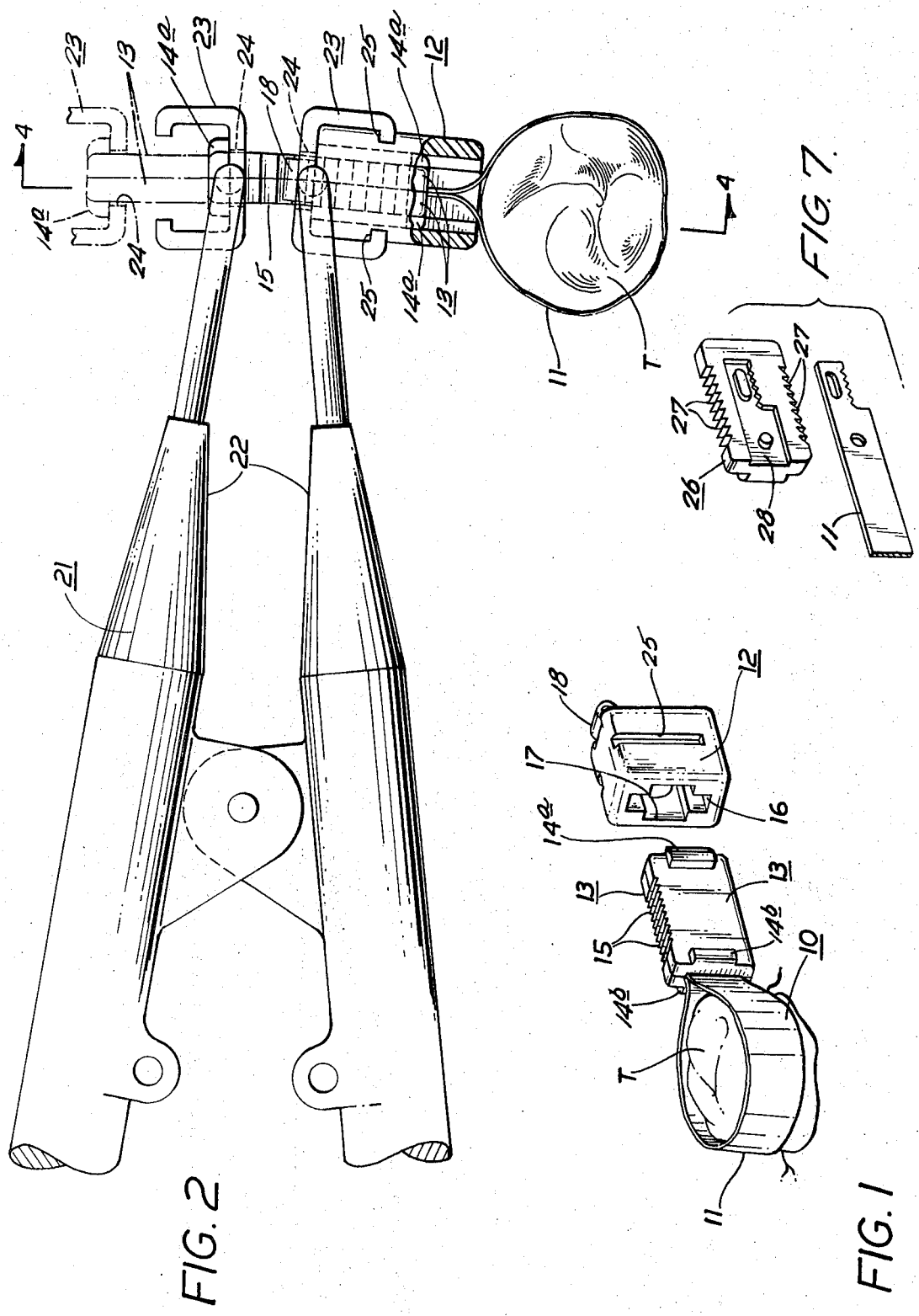

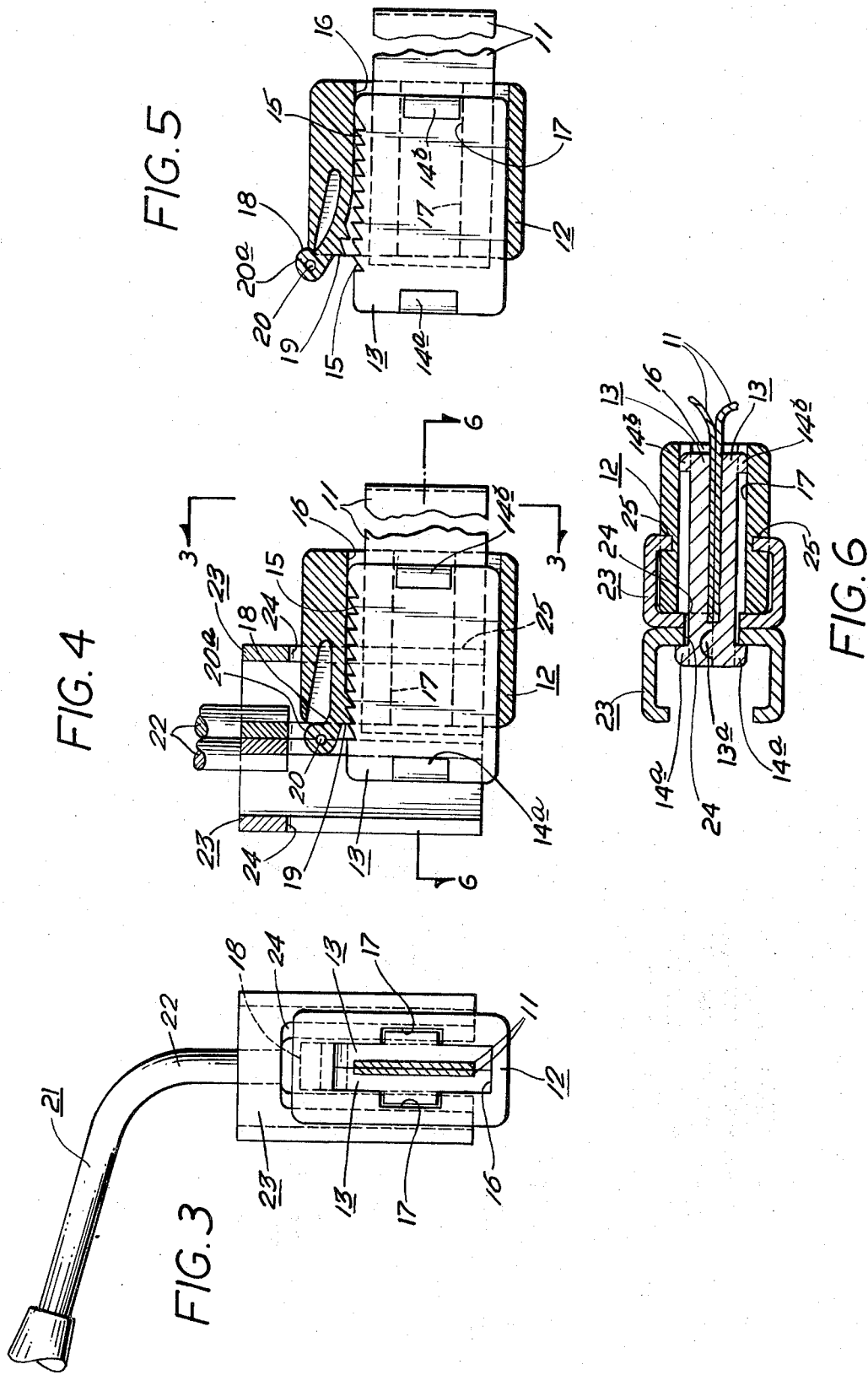

DENTAL MATRIX BAND AND CLAMP

The present invention relates to new and useful improvements in dental matrix bands and clamps for such dental matrix bands.

This invention is an improvement in the dental matrix band and clamp assembly of my prior application, Ser. No. 227,405, filed Feb. 18, 1972.

A primary object of the present invention is to provide a novel dental matrix band and clamp for the dental matrix band in which the matrix band may be easily and quickly positioned about and locked to a tooth and just as easily released from the tooth.

Another object of the present invention is to provide a novel dental matrix band and clamp assembly in which the band may be loosened or tightened about a tooth under normal working conditions to increase or decrease the effective circumference of the band during a filling operation.

A still further object of the present invention is to provide a novel dental matrix band for use with a clamp in which the ends of the band are secured to rigid plastic members which protect the ends of the band and permit easy and convenient removal of the band from the tooth.

Another object of the present invention is to provide a unique dental matrix band and clamp having the features and characteristics set forth above which may be preassembled prior to use and applied to a tooth quickly and easily and which is disposable after use.

It is also an object of this invention to provide a novel matrix band and clamp assembly which is compact and symmetrical with no protrusions or projections which would cause discomfort to the patient or which could interfere with visibility or access to a tooth. This permits the simultaneous multiple use of matrix bands on either side of a tooth thus allowing shorter operating time. Because of the compact size of the clamp, matrix bands may be applied on several adjacent teeth simultaneously in any area of the mouth. In such multiple usage on adjacent teeth, the finished restorations are enhanced by adjustability of the band to optimum contour and shape around each tooth eliminating over-countouring or under-contouring of adjacent fillings by allowing the operator to tighten and loosen each band to his best judgment of contour.

These and other objects of the present invention and the various features and detail of operation and construction thereof are hereafter more fully set forth and described with reference to the accompanying drawings, in which:

FIG. 1 is a perspective view of the dental matrix band of the present invention positioned about a tooth with the clamp member removed from the band;

FIG. 2 is a top plan view of the dental matrix band and clamp assembly with a tool applied to the clamp and band to tighten the band about a tooth;

FIG. 3 is an end elevational view of the clamp and band as viewed along line 3—3 of FIG. 4;

FIG. 4 is a transverse sectional view taken along line 4—4 of FIG. 2 prior to the band being tightened about a tooth;

FIG. 5 is a transverse sectional view similar to FIG. 4 with the latch member released from the band;

FIG. 6 is a sectional view of the band and clamp assembly taken along line 6—6 of FIG. 4; and FIG. 7 is a perspective view of one end of the matrix band and a modified form of end tab prior to assembly.

Referring more specifically to the drawings, there is illustrated in FIG. 1 a tooth T about which is positioned a dental matrix band 10 formed in accordance with the present invention. The band is adapted to be tensioned about the teeth and locked in position by means of a clamp member 12 shown in a position removed from the end of the band. The matrix band 10 consists of a flat flexible metallic strip 11, shaped in a manner similar to a conventional matrix band with its center section bowed edgewise, for example, as illustrated in my prior application referred to previously to enable the band to snugly fit about the diverging walls of a tooth.

Opposite ends of the band 10 are bonded or otherwise secured to rigid end tabs 13, 13 formed as illustrated in FIGS. 1 and 6. The tabs may be made of any suitable plastic material and extend lengthwise of the band end portion with the confronting faces of the tabs recessed as shown in FIG. 6 to receive the band ends and permit the end tabs to lie flat against one another. A projection 13a may be formed on one end tab adapted to fit into a corresponding recess on the confronting face of the other end tab to properly position the tabs with respect to one another and prevent relative movement of the tabs when in use.

An outwardly projecting shoulder 14a is provided at the outer end of each tab to permit engagement of the tabs by a dental tool as set forth hereinafter for the purpose of tightly drawing the band about a tooth while a second projecting shoulder 14b is provided at the inner end of each tab to prevent the tabs from being pulled completely through the clamp. In addition, a series of teeth 15 inclined toward the central portion of the band are formed in at least the upper surface of each end tab, with the teeth of one tab in alignment with the teeth of the other tab when the tabs are in their proper confronting relation.

In accordance with the present invention a clamp member 12 is provided to engage over the end tabs of the matrix band and permit the band to be drawn tightly about a tooth and locked in position on the tooth. The clamp member 12 may be formed of any suitable plastic material and has a generally rectangular shaped opening 16 extending longitudinally through the clamp. The opening 16 is of a width and height substantially equal to the width and height of confronting end tabs so that the tabs will fit snugly within the opening. A pair of recesses 17, 17 are provided along opposite side edges of the opening 16 to permit passage of the shoulders 14a of the end tabs through the opening.

To prepare the band and clamp for use, the band central portion is looped upon itself with the end tab portions positioned in confronting relation. The end tab portions are partially inserted through the central opening 16 of the clamp, for example, to the position as shown in FIG. 4. With the band and clamp thus assembled the band may then be placed in position about a previously prepared tooth and drawn tightly about the tooth. In order to secure the band about the tooth and prevent the band from loosening on the tooth during the process of filling the tooth a releasable latch member 18 is provided. The latch member 18 may be formed, for example, as illustrated in FIGS. 4 and 5 of the drawings as an integral part of the clamp, overlying the upper rear end of the central clamp opening 16. At least one tooth 19 is provided on the lower surface of the latch 18 to simultaneously engage with corresponding teeth 15 of the band end tabs. The latch member is resilient and is normally biased downwardly into engagement with the teeth of the tabs. When the end tabs are pulled through the central opening of the clamp in a direction to tighten the band about the tooth, the tooth 19 of the latch member will ratchet over the teeth 15 of the end tabs. However, because of the inclination of the teeth 15, the latch member will prevent movement of the end tabs in the reverse direction relative to the clamp. An opening 20 is provided in an enlarged head 20a at the terminal end of the latch end 18 to permit the latch to be engaged by a conventional dental pick or explorer and raised out of engagement with the teeth 15 of the end tabs thereby allowing freedom of movement of the end tabs in the reverse direction through the clamp. The enlarged head end of the latch will engage over the upper edge of the clamp member 12, for example, as shown in FIG. 5, when the latch is raised to its upper limit position and be held in this position permitting easy removal of the clamp from the band.

In order to tension the band and urge the clamp snugly against the tooth, a tool 21 is provided which consists of pivoted handle members 22, 22 terminating in similar confronting slotted jaw portions 23, 23. The jaws terminate in upwardly extending spaced flange portions providing slotted openings 24, 24 which fit over the confronting band end portions 13, 13, for example, as shown in FIG. 6. In this position, one jaw is in engagement with the shoulders 14a, 14a of the band end portions and the other jaw is in engagement with the rear surface of the clamp 12. As the tool handles are moved together, the matrix band is pulled tight about the tooth. When the desired tension on the band has been reached, the tool is removed from the clamp and band end portions leaving the matrix band and clamp in position on the tooth. If it is desired to loosen the matrix band, the latch member 18 may be raised permitting movement of the band end portions in the opposite direction through the clamp opening. To remove the matrix band after completion of the filling operation, the latch member 18 is raised to its position where the enlarged head engages over the clamp as shown in FIG. 5, and the clamp is completely removed from the band end portions. Thereafter the matrix band is removed from about the tooth in the conventional manner.

The tool 21 may also be used to manipulate the clamp when the clamp and band are being applied to the tooth by virtue of the fact that one jaw 23 of the tool 21 is engaged in slots 25, 25 in the sides of the clamp member 12 thereby providing a means for holding the clamp member during application to a tooth.

In FIG. 7 there is illustrated one end of a matrix band 11 together with a modified form of end tab 26 which has a series of teeth 27, 27 along both its upper and lower surface. In this end tab, a recess 28 is formed along its inner surface of the same configuration as the end of the matrix band. A pair of lugs and a series of teeth are provided in the recess 28 as shown in FIG. 7 adapted to engage with similar shaped openings and teeth on the matrix band end. Thereafter heat may be applied to the tab 26 and matrix band end to bond the matrix band to the tab.

From the foregoing it will be observed that the present invention provides a novel dental matrix band and clamp which is compact and symmetrical and thus can be applied with equal ease on either the buccal or lingual aspect of any tooth. Because of the compact design of the clamp without any protrusions, application may be made on several adjacent teeth in one or more areas of the mouth simultaneously thereby saving time for both the dentist and the patient.

While a particular embodiment of the present invention has been illustrated and described herein it is not intended to limit the invention to such a disclosure and change and modifications may be incorporated and embodied therein within the scope of the following claims.

I claim:

1. A dental matrix band and clamp assembly comprising: a matrix band having a central tooth engaging portion and opposite end portions, a tab member secured to each end portion of the band, each said tab member having a proximate and distal face and upper and lower side edge surfaces, said band adapted to be folded back upon itself with said opposite end portions and the proximate faces of said tabs in confronting relation to form a tooth engaging loop at the mid-portion of the band, a clamp member having a central aperture extending longitudinally therethrough to slidably receive said confronting tab members, means defining a projecting shoulder on the distal face of each tab adjacent the terminal ends of said band with said shoulders facing toward the mid-portion of the band, a locking surface formed on at least one side edge surface of each tab, and resilient locking means carried by said clamp normally urged into engagement with the locking surface of each of said tabs to permit movement of said tabs through the central aperture of said clamp in a direction pulling said tooth engaging loop of said band toward said clamp and prevent movement of said tabs through said aperture in the opposite direction, said locking means being manually displaceable out of engagement with the locking surfaces of said tabs to permit movement of said tabs through the central aperture of said clamp in said opposite direction.

2. Apparatus in accordance with claim 1 in which the locking surfaces on said tab side edges comprise a uniform series of serrations forming locking teeth on said tabs inclined in a forward direction away from the terminal ends of said band, and the locking means on said clamp comprises a resilient catch member formed as an integral part of said clamp, said catch member terminating in a projecting tooth adapted to resiliently engage the locking teeth on said tabs.

3. Apparatus in accordance with claim 2 in which the locking teeth on said tabs extend normal to the distal and proximate faces of said tabs with the teeth of one tab in alignment with the teeth of the other tab when said tabs are in said confronting relation.

4. Apparatus in accordance with claim 1, in which said shoulders on said tabs extend in a direction normal to said upper and lower side edges of said tabs and terminate short of the upper and lower edges of said tabs, and means defining opposed longitudinal slots within the central aperture of said clamp to receive and permit passage of said shoulders through said clamp aperture.

5. Apparatus in accordance with claim 4 in which said clamp terminates in a rear surface extending in a plane normal to the longitudinal axis of the clamp aperture and said tabs are positioned in said clamp with said shoulders extending beyond and facing the rear surface of said clamp.

6. Apparatus in accordance with claim 4 including a set of stop members on said tabs at the opposite end of said tabs from said shoulders facing toward said shoulders to prevent said tabs from passing entirely through said clamp aperture in the direction pulling said tooth engaging loop of the band toward said clamp.

7. Apparatus in accordance with claim 4 including a pair of transverse slots on the external surface of said clamp member extending in a direction normal to said longitudinal slots to permit grasping and holding of said clamp member.

8. A dental matrix band adapted to be positioned about a tooth and locked in position by means of a clamp, said band comprising a central tooth engaging portion terminating in opposite end portions, a tab member secured to each end portion of the band, each of said tabs having proximate and distal faces and upper and lower side edge surfaces, said band adapted to be folded back upon itself with said opposite end portions and the proximate faces of said tabs in confronting relation to form a tooth engaging loop at the mid-portion of the band, engageable shoulder means projecting outwardly from the distal face of each tab, and a uniform series of serrations along at least one side edge surface of each tab, said serrations forming locking teeth on said tabs inclined in a forward direction away from the terminal ends of said band.

9. Apparatus in accordance with claim 8 including indexing means on the proximate faces of each tab to prevent movement of said tabs relative to one another when said tabs are in said confronting relation.

10. Apparatus in accordance with claim 8 in which said shoulders extend in a direction normal to said upper and lower side edges of said tabs and terminate short of the upper and lower side edges of said tabs.

* * * * *